INVENTOR.
Ernest P. Pischel
BY TW Secrest

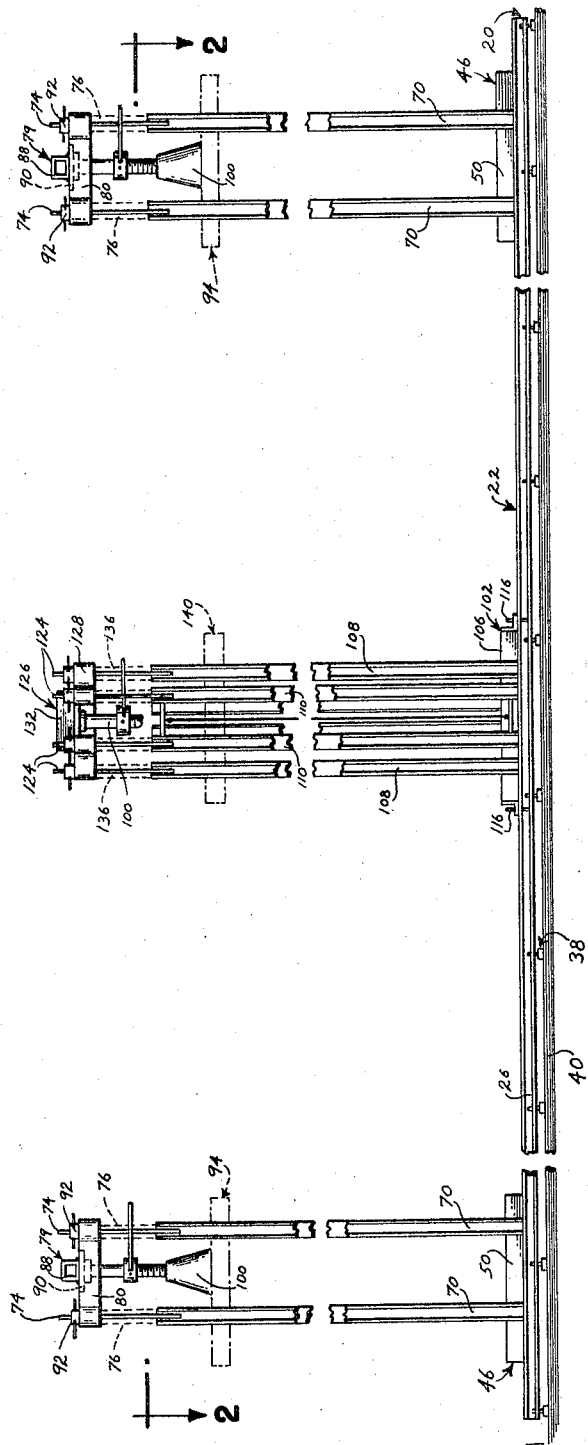

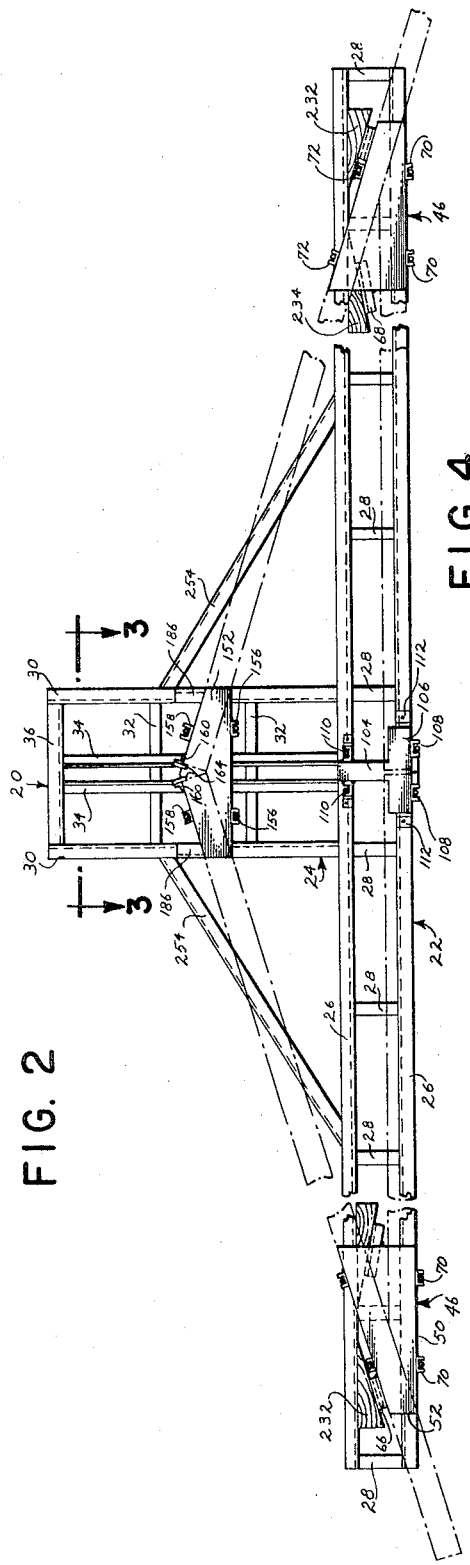
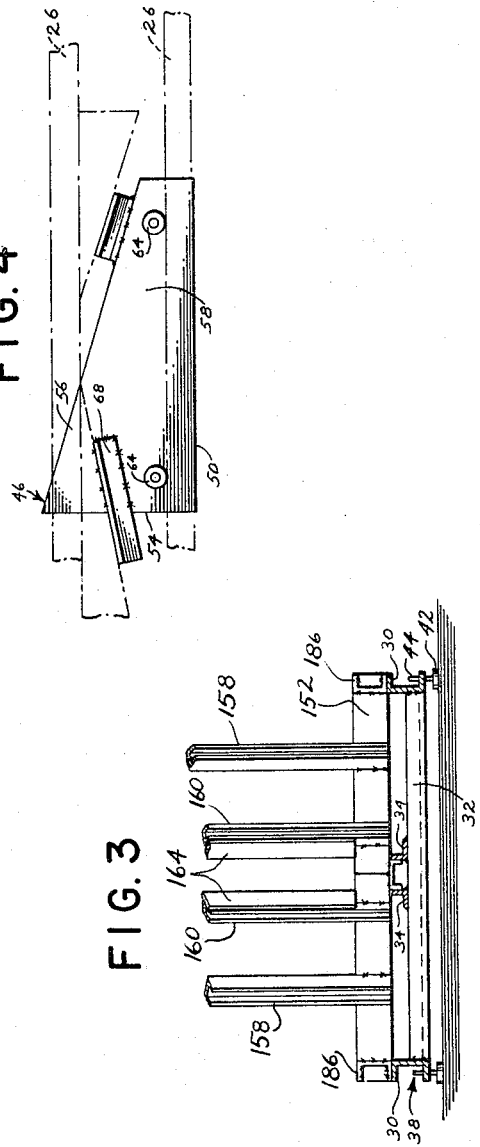

Jan. 3, 1967  E. P. PISCHEL  3,296,053
PROCESS FOR SIMULTANEOUSLY MANUFACTURING A MULTIPLICITY
OF TRUSSED RAFTERS
Filed Sept. 1. 1965  6 Sheets-Sheet 4
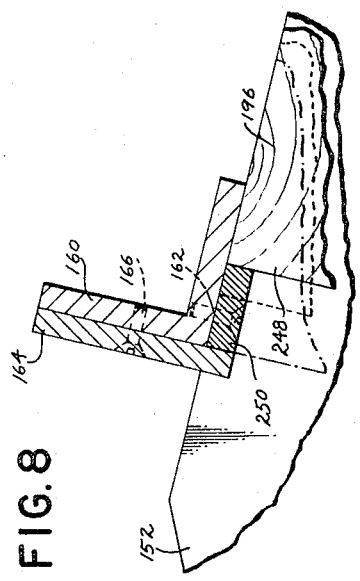
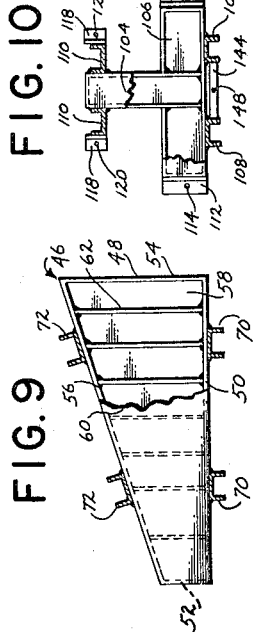
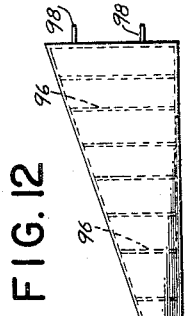
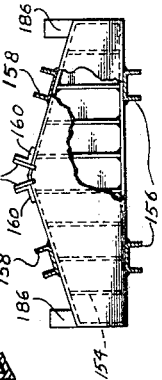
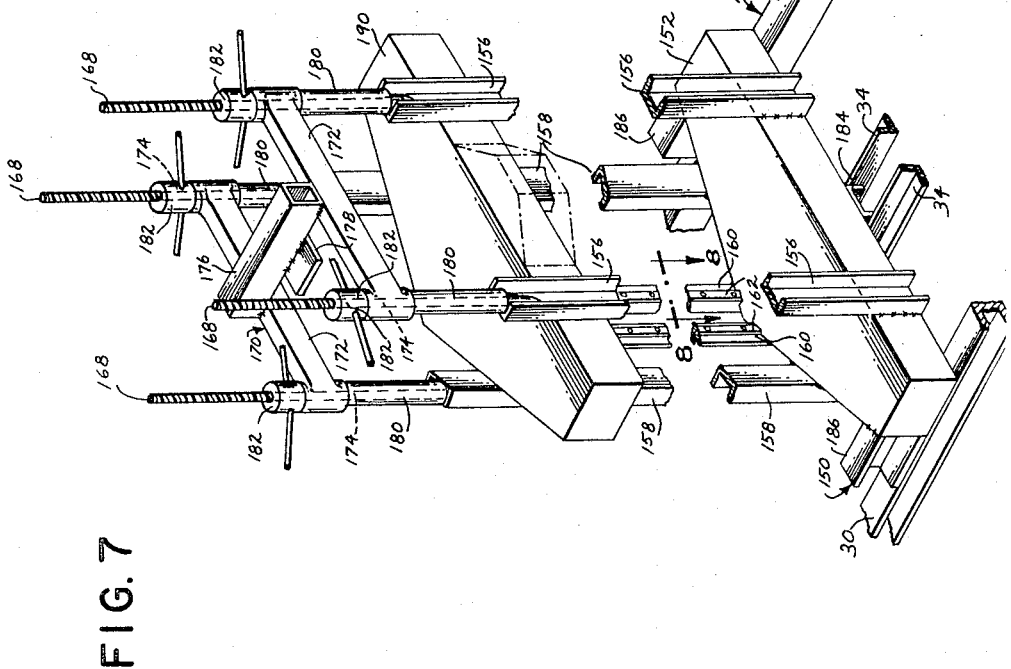
INVENTOR.
Ernest P. Pischel
BY T W Secrest

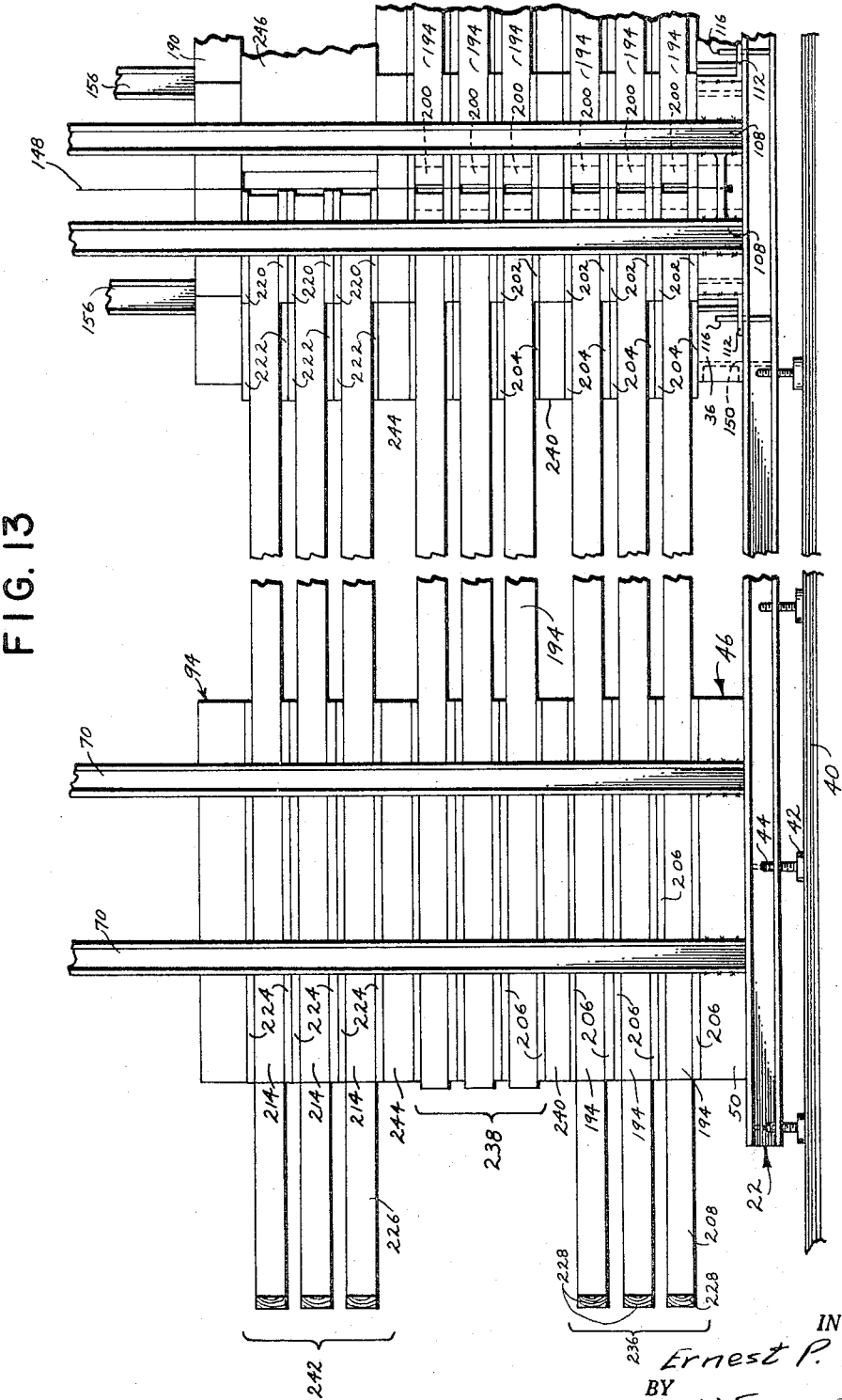

Jan. 3, 1967 E. P. PISCHEL 3,296,053
PROCESS FOR SIMULTANEOUSLY MANUFACTURING A MULTIPLICITY
OF TRUSSED RAFTERS
Filed Sept. 1. 1965 6 Sheets-Sheet 6

INVENTOR.
Ernest P. Pischel
BY TV Secrest

United States Patent Office

3,296,053
Patented Jan. 3, 1967

3,296,053
PROCESS FOR SIMULTANEOUSLY MANUFACTURING A MULTIPLICITY OF TRUSSED RAFTERS
Ernest P. Pischel, Rte. 1, Box 179,
Freeland, Wash. 98249
Filed Sept. 1, 1965, Ser. No. 487,969
14 Claims. (Cl. 156—288)

This invention relates to a method for the manufacture of trussed rafters and, also, to a jig which may be used in the manufacture of said trussed rafters.

This application is a continuation-in-part of applicant's copending application, Ser. No. 76,703, filing date of Dec. 19, 1060, now abandoned.

Approximately twenty years ago, prefabricated trussed rafters were brought forth wherein supporting gussets for the rafters were nailed to the chords to form the rafter. More particularly, rafters have been used in building construction for a number of years, but they have generally been made at the site of usage and the chords, bottom and top chords, have been nailed into place at the construction site. As stated, a few years ago it was considered feasible to prefabricate the trussed rafters; and, instead of nailing the chords together, it was decided to use gussets and nail the gussets to the chords and thereby speed up the process of making the rafters and, by so doing, decrease the cost.

With this background in mind of the manufacture of trussed rafters, I have invented a method and an apparatus for the manufacture of these rafters wherein it is possible to simultaneously manufacture a large number of trussed rafters on one jig. Before my invention I believe that this has never been accomplished. Accordingly, an advantage of my method and apparatus is that it is possible to make trussed rafters at a lower cost than has been previously realized. This is so because of the saving in labor cost. Also, it is possible to simultaneously make a large number of these rafters in a small floor space or area. Further, it is possible to make trussed rafters according to my method and apparatus in a shorter space of time than has been previously realized with other methods and apparatus for the manufacture of these rafters. A further advantage, and one which lends itself to the versatility of my method and apparatus, is that it is possible to make more than one type of rafter at a time. For example, with my trussed jig it may be desirable to make four types of one rafter, two types of another type of rafter, and still a third type of rafter. Along with this versatility of making more than one type of rafter at a time, it is seen that it is possible to make more than one order of rafters at a time. For example, it may be necessary to make three or four orders of different trussed rafters at one time. Further, with my apparatus it is possible to package these different orders while still on the jig. This can be accomplished by means of a wire strap machine whereby all the rafters of one order are strapped on the machine, lifted from the machine by means of a fork truck or other apparatus, transferred to the delivery truck and taken out to the site of usage.

These and other objects and advantages will be more clearly brought forth by reference to the following drawings, specific description of the invention and the appended claims.

In the drawings:

FIGURE 1 is a fragmentary front elevational view of a specific trussed jig constructed in accordance with the preferred teachings of this invention;

FIG. 2, taken on line 2—2 of FIG. 1, illustrates the arrangement of the longitudinal frame section and the lateral frame section and the upright supports with respect to these frame sections;

FIG. 3, taken on line 3—3 of FIG. 2, illustrates the arrangement of the standards on the upright guide on the lateral frame section;

FIG. 4 illustrates the manner in which the upright guides are firmly positioned so as to receive and support the heel gussets;

FIG. 7 is a fragmentary perspective view looking at the upright guide and the base plate for receiving the peak gussets which join the top chord members;

FIG. 8, taken on line 8—8 of FIG. 7, illustrates the stop means for variably positioning the top chord members with respect to the peak gusset;

FIG. 9 is a plan view looking down on the top of the left base plate used for supporting the heel gussets and illustrates the construction of this base plate by the removal of the top plate so as to show the supporting interior ribs.

Figure 6:
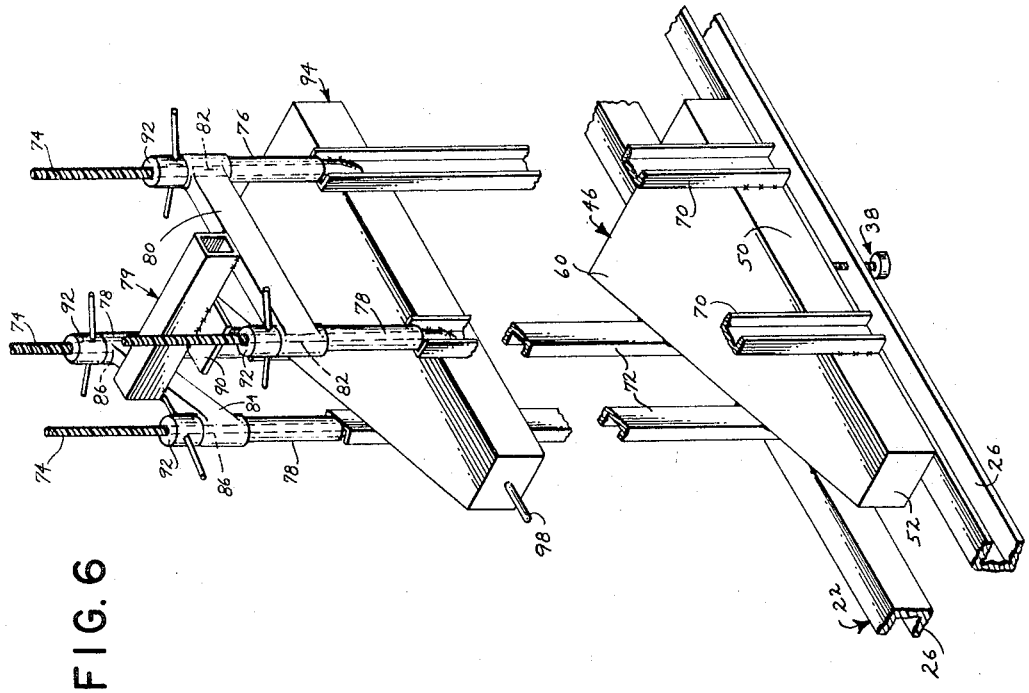
FIG. 6 is a fragmentary perspective view looking at the upright guide and the base plate for receiving the heel gussets which join the bottom chord and the top chord members.
Figure 5:
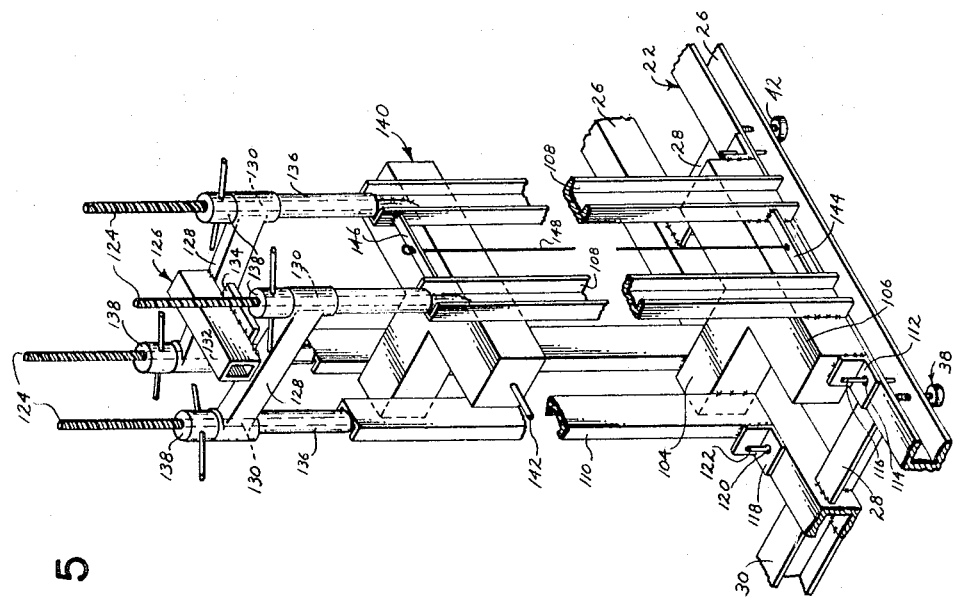
FIG. 5 is a fragmentary perspective view looking at the upright guide and the base plate for receiving the splice gussets of the trussed rafter members.
Figure 14:
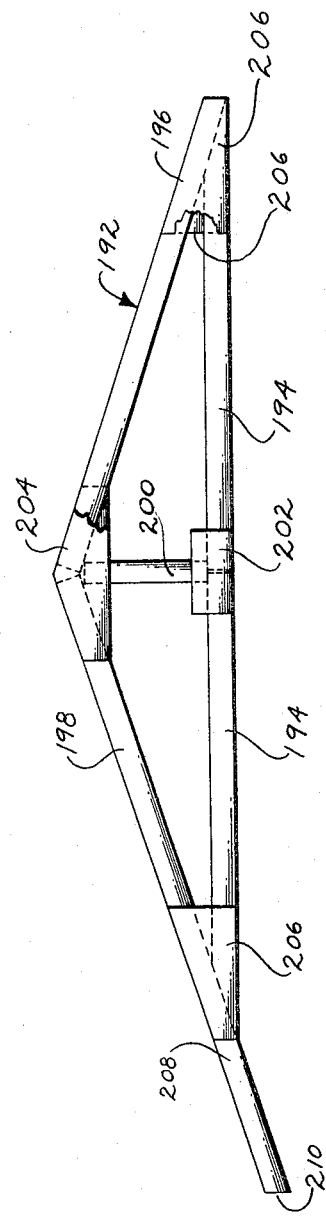
Figure 15:
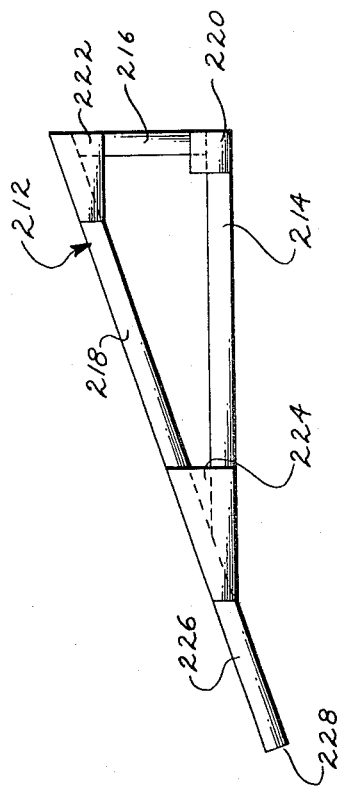

FIG. 10 is a plan view looking down on the base plate and illustrates the top skin of this base plate removed so as to reveal the interior construction;

FIG. 11 is a plan view looking down on the apex of the base plate and shows part of the upper skin removed so as to reveal the supporting ribs in the interior of the base plate;

FIG. 12 is a view of a pressure plate as used with the left heel gusset and illustrates by means of a ghost line the interior ribs;

FIG. 13 is a fragmentary front elevational view of the trussed jig with three different types of trusses and which trusses are separated by spacers so as to be packaged individually for shipment, and there are three trussed rafters in each of the three sets of rafters;

FIG. 14 illustrates a king-post trussed rafter as manufactured by this trussed jig and the method of this invention; and, FIG. 15 illustrates a one-half king-post trussed rafter as manufactured with this trussed jig and within the method of this invention.

Referring to the drawings it is seen that the invention comprises a trussed jig 20 and a longitudinal frame section 22 and a lateral frame section 24. The longitudinal frame section 22 comprises two spaced-apart longitudinal U-channels 26 having their legs directed horizontally outward. The channels 26 are connected by lateral braces 28. The braces may be welded to the channels.

The lateral frame 24 comprises two outer spaced-apart U-channels 30 having the legs horizontally directed outward. These legs are joined by braces 32. Between the channels 30 are two spaced-apart angle irons 34 having their legs directed both outwardly and upwardly. These angle irons 34 rest or are positioned on top of the braces 32. The braces 32 can be welded to the channels 30 and the angle irons 34 can be welded to the braces 32. The ends of the channels 30 are joined by a light channel 36 which functions as a brace. The longitudinal frame 22 and the lateral frame 24 are supported on pedestals 38 which rest on the floor or ground 40. The pedestal 38 comprises a circular base 42 and a threaded shaft 44. This threaded shaft screws through a tapped passageway in the bottom leg of the appropriate channel 26 or 30.

The trussed jig 20 comprises two heel gusset upright guides 46. The upright guide 46 comprises a base support 48 of a generally trapezoidal configuration having a face 50 which cofits with the front of the longitudinal frame 22, a short side 52 and a long side 54, and a back face 56. The side 52 and the face 50 are at substantially right angles and the side 54 and the face 50 are at substantially right angles. The base support 48 has a lower skin 58 and an upper skin 60. Running between the front face 50 and the back face 56 are a series of internal supports 62. The supports 62 are substantially parallel to the two sides 52 and 54. On the lower face of the skin 58 there are two spaced-apart rollers 64. These rollers run against the base of the front channel 26. Tact welded to the back face 56 and near the side 52 is a block or spacer 56. Welded to the face of the skin 58 and at an angle with respect to the block 66 is a block 68. If the longitudinal axis of the block 66 were extended and the longitudinal axis of the block or wedge 68 were extended, the two would intersect. Welded to the front face 50 of the base 48 are two spaced-apart channels 70. Welded to the rear face 56 of the base 48 are two upright standards 72. These standards may be of a considerable height such as six feet high or higher. The standards 70 and 72 are, in effect, U-channels with the base of the channel abutting or being welded to the respective face 50 or 56. Welded to the inner face of the upright standards 70 and 72 are bolts or threaded rods 74. A bushing 76 is adapted to fit over each threaded rod 74 so as to space a spider frame 78 away from the top of the upright standards 70 and 72.

The spider frame 78 comprises a bar 80 having two drilled passageways 82 in its ends for cofitting with the threaded rods 74 on the upper end of the channels 70. The frame also comprises a bar 84 having two drilled passageways 86 in its ends for cofitting with the threaded rods 74 on the upper end of the channels 72. The two bars 80 and 84 are connected by a bar or a tubular member 88. Actually, the tubular member 88 may just be a flat bar although for purposes of weight it is desirable to have it as light as possible so that a worker can lift the spider frame 78. On the underneath side of the bar 88 there is a bearing plate 90 which is welded. The spider frame 78 can be lifted off the threaded rod 74 or placed over the threaded rod 74 by means of the drilled passageways 82 and 86. Wing nuts 92 can be screwed onto the threaded rods 74 so as to tighten the spider frames 78 in place.

Cofitting member for this upright guide is a pressure plate 94. The pressure plate 94 is of substantially the same configuration as the base plate 46. The pressure plate 94 is of the generally trapezoidal configuration having two parallel sides and two sides at an angle. Also, it has an upper face and a lower face. The pressure plate is substantially hollow except for reinforcing supporting ribs 96. On the parallel sides are gripping handles 98. After the trussed rafters have been laid up, the pressure plate 94 is placed over the trussed rafter and is forced against the heel gusset or against the trussed rafter. This is accomplished by means of a jack 100, see FIG. 1. In this figure the pressure plate 94 is shown in phantom and the jack 100 is shown bearing against the upper face of the pressure plate and, also, against the bearing plate 90 of the spider frame 78. In this manner a great deal of pressure can be exerted against the trussed rafter with the minimum of mechanical equipment.

Positioned between the two upright heel gusset guides 46, and on the longitudinal frame 22, is an upright splice gusset guide 102. The guide 102 comprises a base member in the configuration of a "T" having a leg 104 and a cross member 106. Attached to the outer sides of the cross member 106 are two spaced-apart upright guides or U-channels 108. These channels are welded to the side with the base bearing against the side. Attached to the side of the leg 104 are two upright guides or U-channels 110. The channels 110 are attached by welding the legs to the side. The guides 110 are positioned so that one is on each side of the leg 104.

On each end of the cross member 106 is attached a lug 112. This lug, in effect, is a piece of an angle. In the lug 112 is a passageway 114. The passageways 114 are aligned with the passageways in the upper leg of the U-channel 26 of the longitudinal frame 22. A pin 116 projects through the passageway 114 and the passageway in the upper leg of the U-channel 26 so as to position the upright guide. Welded to the outer leg of the guide 110 is a lug 118 having drilled passageway 120 therein. In the upper leg of the U-channel 26 of the longitudinal frame 22, there is a passageway which cofits with the passageway 120. A pin 122 projects through the passageway 120 and the passageway in the upper leg of the channel 26 so as to firmly position the guide 102.

On the upper end of the channels 108 and 110 are welded threaded rods 124. A spider frame 126 connects the upper ends of these rods 124. This frame 126 comprises a bar 128 having passageway 130 in each end. The forward passageway 130 fits over the rod 124 on one of the channels 108 and the other passageway 130 fits over one of the threaded rods 124 on one of the channels 110. The bar 128 interconnects the threaded rods 124 on the same side of the leg 104. There is another connecting bar 128 of the same configuration which connects the other threaded rods 124 on channels 108 and 110. A cross member 132 connects with the upper part of the two connecting rods 128 so as to form the spider frame. The cross member 132 may be welded to the connecting bars 128. There is welded on the underneath surface of the cross member 132 a bearing plate 134. The spider frame 126 fits over the threaded rods 124 by means of the passageways 130. The frame 126 is spaced-apart from the upper ends of channels 110 by means of bushings or sleeves 136. The frame 126 is firmly positioned on the threaded rods 124 by means of wing nuts 138.

A pressure plate 140 of the same general configuration as the base members 104 and 106 of the upright guide 102 cofits with the guide 102. This pressure plate is of a general "T" configuration having a leg and a cross member. On the sides of the cross members are handles 142 for lifting the pressure plate. The pressure plate is of a generally hollow construction having the leg extend all the way to the top of the T in the interior of the plate so as to give reinforcement for the bearing faces.

As with the heel gusset upright guide 46 there is provided a screw-type jack 100 for bearing against the upper face of the pressure plate 140 and the pressure plate 134 to squeeze together the trussed members during the formative stages of the truss.

Near the base of the upright channels 108 there is tack welded a cross member 144. Near the upper end of the channels 108 there is tack welded cross member 146. Stretched between the two cross members 144 and 146 is a string or wire 148. This wire is the center line of the king post truss and indicates where the inner ends of the two bottom chords of the king post truss should meet. It may be considered to be a plumb line for the bottom chords of the king post truss.

Referring now to the lateral frame section 20, it is seen that there is associated with this frame section a peak gusset upright guide 150. This upright guide 150 comprises a base member 152 having face plates in sides. The face plates are in the configuration of a five-sided member. There is the base, two parallel sides and two upwardly sloping sides which slope to a peak. Connecting the two face members are the base side, the two parallel sides and the two upwardly sloping sides. The base member 152 is of a hollow construction and has interior supporting ribs 154. Welded to the base side, and in a spaced-apart relationship, are two upright standards or channels 156. These channels in cross-section are in the configuration of a U having two sides and a base. On each of the upward sloping sides are welded an upright standard or channel 158 having a base and two legs. Also, on each upward sloping side, and near the peak, there is attached an angle iron 160. This angle iron 160 may be attached by means of a bolt 162.

There is attached to the outwardly direct leg of the angle iron 160 a stop 164. This stop may be attached by means of bolts 166. It is seen in FIG. 8 that the stop projects inwardly of the angle 160 so as to overlie the upper face of the base member 152. The reason for this will be brought out in more detail in a later part of the specification.

Welded to the inner face of the base of the channels 156 and 158 are threaded rods or bolts 168. A spider frame 170 fits over the upper part of the threaded rod 168. This frame comprises two spaced-apart bars 172. In the members 172, and at the outer ends, are drilled passageways 174. A cross brace 176 connects the upper parts of the members 174. On the underneath side of the cross base 176 there is a bearing plate 178.

Sleeves 180 or bushings 180 space the spider frame 170 from the upper part of the channels 156 and 158. Wing nuts 182 are screwed over the top of the bars 172 so as to firmly position the spider frame 170 on the threaded rods 168.

On the undernearth face of the base member 152 there is welded a U-channel 184. This U-channel cofits with the spaced-apart angle iron 34 so as to position the upright guide 150.

On the lower end of each slope side of the base member 152 there is positioned a spacer channel 186. This spacer channel 186, when the upright guide 150 is moved all the way back on the lateral frame section 20, protects the angle 160 and the stop 164 from hitting the channel 36.

There is used in conjunction with this upright standard 150 a pressure plate 190. This pressure plate 190 is of the same general configuration as the base member 152. It has two face plates, two parallel sides, a base side, and two sloping sides which slope into a peak. In use there is employed a jack which bears against the plate 178 and the pressure plate 190. The pressure plate 190 is placed on top of the gussets and the jack extended so as to force the pressure member 190 down onto the gussets and the trussed members.

In FIG. 14 there is illustrated a form of trusses which may be manufactured on this trussed jig 20.

This trussed rafter 192 comprises two lower chords 194, an upper chord 196 and a second upper chord 198. There is a king post 200 for supporting the upper part of the two upper chords 196 and 198. The lower part of the king post 200 and the inner part of the two lower chords 194 are joined by gussets 202. It is to be realized that there are two of these gussets, one on each side of the chords. The gusset 202 is referred to as a splice gusset. A gusset 204, a peak gusset, connects with the upper part of the king post 200 and the upper part of the chords 196 and 198. Again, there are normally two gussets 204, one on each face of the chords and the king post. A heel gusset 206 connects the outer part of the lower chord 194 with respective upper chord 196 or 198. Again, there are two heel gussets, one on each face of the chords.

In FIG. 14 it is seen that on the left of the trussed rafter 194, the chord 198 overhangs at 208 and terminates in what is referred to as a plum cut 210. Also, it is seen that the upper chord 196 is cut off so as to be flush with the outer edge of the heel gusset 206. In this particular instance there is no overhang. It is to be realized, however, that trussed rafters may be made with or without overhang on both of the sides.

In FIG. 15 there is shown one-half of a trussed rafter 212. This trussed rafter comprises a lower chord 214, a king post 216 and an upper chord 218. A splice gusset 220 connects the lower part of the king post 216 with the inner part of the lower chord 214. A peak gusset 222 connects the upper part of the king post 216 with the upper part of the upper chord 218. And, a heel gusset 224 connects the outer part of the lower chord 214 with the chord 218. In this particular instance 218 overhangs at 226 and terminates in what is referred to as a square cut 228.

In FIG. 13 there is illustrated a method for simultaneously manufacturing a multiplicity of different trusses with this truss jig. In the manufacture of the trusses, the gussets and the chords are precut to the desired size. The upright guide 150 is positioned on the lateral frame section 24. Also, heel upright guides 46 are positioned on the longitudinal frame section 22. The heel gusset upright guides 46 are positioned on the longitudinal frame 22 by means of blocks 232 and 234. These blocks are of a wedged configuration and it is seen that the block 232 fits between the base of the inner rail 26 and the angle 68, and that the block 234 fits between the base of the inner rail 26 and the spacer 66. As is recalled, the splice gusset upright guide is positioned by means of pins 116 and 122.

In laying up the trussed members an adhesive is applied to one face of the gussets. Referring again to FIG. 3, it will be assumed that the adhesive has been applied to the one face of the gussets 206, 202 and 204. Then the chords are laid on top of the gussets and over the adhesive, more particularly, chords 194 and king posts 200 are laid in position on the gussets. The respective heel gussets, splice gussets and peak gussets, having glue on the lower face, are laid over the chords, then over these gussets are laid gussets having adhesive on the upper face and the next chords are laid on these until the number of trussed rafters desired have been laid up. In FIG. 13 one set of trusses 236 has been laid up in this manner.

In a like manner, another set of trusses 238 may be manufactured simultaneously with the set of trusses 236. Between the set 236 and the set 238, there are placed spacer blocks 240. The trusses of the set 238 are king post trusses similar to the trussed rafter 192 but do not have an overhang. In preparing the trussed rafters of the set 238, there are laid down the gussets 206, 202 and 204 with adhesive on the upper face. Then the chords 194, 198 and king post 200 are laid on top of the gussets having adhesive on the lower face. Then, other gussets and chords are laid in position to form the set of trussed rafters 238

Again, simultaneously there may be manufactured a third set of trussed rafters 242. These trussed rafters, in effect, are only one-half of the king post trussed rafter and are similar to the trussed rafter 212. Between the rafters 238 and 242, there are placed spacer blocks 244. However, it is to be realized that the space or volume taken up by the chords and the gussets of the left side of the trussed rafter 242 is left void on the right side. Therefore, it is necessary to provide blocks or spacing material 246. Referring to FIG. 13, it is seen that this spacing material is between the spacer block 244 and the respective pressure member, in this instance, 190. In laying up this set of trussed rafters, gussets 224, 222 and 220 with adhesive on the upper faces are laid over the spacer blocks 244. Then, the respective chords and the king post are placed in position on the gussets. Then, gussets with adhesive on the lower faces are laid over these chords. This procedure is continued until a sufficient number of trussed rafters are laid up.

After the chords and the gussets of the trussed rafters have been laid in position, the respective pressure plates are laid over gussets, the spider frames are firmly attached to the threaded rods of the upright guide members, and the jacks are placed in position. Then the jacks are extended so as to squeeze together the chords and the gussets. The trussed members are held under pressure for a sufficient period of time to allow the adhesive to cure so as to hold together the gussets and the chords.

In aligning of the lower chords, the king post and the splice gussets, it is seen that the wire or string 148 is used to position these members. After the adhesive has been allowed to cure and prior to removing the trusses from the trussed jig, it may be desirable to bind them for shipping. This can easily be done by taking a metal strap binder and running the metal straps around the trusses in the set 236, then running metal straps around the trusses in the set 238, and running metal straps around the trusses in the set 242. In this way there are bound together three separate sets of trusses. As is readily appreciated, all of the trussed rafters in a set may be identical or all of the trussed rafters may be different, viz., a full truss rafter of different dimensions and half truss rafters of different dimensions.

The jack can be retracted, the spiral frame removed and a fork lift can be used to take a set of trusses 242 and load it onto a truck. Then the set of trusses 238 can be removed by a fork lift and loaded onto a truck. Similarly, a set of trusses 236 can be removed and loaded onto another truck for delivery. In this manner it is possible to bind the trusses while still in the trussed jig before delivery and then to unload the trusses as separately bound units.

It is seen from this trussed jig that it is possible to manufacture trussed rafters of various spans. In trussed rafters of a long span, it is seen that the upper chords 196, 198 and 218 will have greater width than the corresponding chords of short trussed rafters. Therefore, to take into account the positioning of the upper and outer edges of these upper chords 196, 198 and 218, there is employed the stop 164 near the peak of the peak gusset upright guide 150. More particularly, for trussed rafters of a short span, the outer part of the end of the chord referred to as end 248, may be positioned abutting the stop 164. However, with the trussed rafters of a longer span, it is necessary to position the outer part of the end 248 away from the peak so that the lower part of the end 248 will not be in the way of the corresponding lower end of the adjacent trussed rafter. This can be achieved by means of a spacer 250. From a practical standpoint, this spacer 250 can be a piece of wood such as a 2″ x 4″, a 2″ x 2″, or a 2″ x 6″ depending upon the width of the upper chord.

In the manufactrue of these trussed rafters, it is to be realized that a number of adhesives may be employed. For example, depending upon the moisture content and the type of use to which the trussed rafter will be placed, there will be used a corresponding adhesive. If the trussed rafter is to be used where it is quite moist, there is danger of water getting into the glue-wood joint between the gussets and the chords, then there is used an exterior grade of plywood for the gussets and, also, a water proof adhesive. However, if the trussed rafter is in place where it is dry and there is no danger of moisture getting into the glue-wood bond, then there may be used a plywood gusset and an interior type of adhesive or glue between the gussets and the chords. Furthermore, depending upon the production schedule, there may be used adhesives having different curing times. Generally speaking, an adhesive with a rapid curing time is more expensive than an adhesive with a slow curing time. As a result, if production is not being pushed at a particular time, there may be used a slower curing adhesive and, therefore, a less expensive adhesive. However, if production is being pushed, it may be desirable to use a rapid curing adhesive so as to get the maximum production use out of the trussed jig.

Having described my invention, I wish to claim the various modifications and facets of both the method and the apparatus. For example, changes may be made with various trussed rafter jigs and still be withinn the scope of the appended claims. In this particular instance, there are employed bracing bars 254 running between the longitudinal frame section 22 and the lateral frame section 24. In place of these bracing bars, it may be possible to use a different type of support for both the longitudinal and lateral section. Also, trussed rafters having various configurations may be made on this trussed jig and still be within the scope of the claims. Further, it is to be realized that upright guides 46, 102 and 150 may be employed having various pitches and still be within the scope of the claims. To use guides having various pitches is only necessary to build the guides and place them in position on the longitudinal frame action 22 and the lateral frame section 24. Such manufacture and use of upright guides having various pitches is within the scope and intention of this invention.

What I claim is:

1. A method for simultaneously manufacturing a multiplicity of trussed rafters having chords and gussets with an adhesive bond between the chords and the gussets, said method comprising: positioning the chords and gussets of a first rafter in the desired position, insuring that there is an adhesive between the gussets and respective chords; positioning the chords and gussets of a second rafter in the desired position with respect to the gussets of the first rafter, insuring that there is an adhesive between the gussets and the respective chords; performing said positioning of the chords and the gussets as many times as desired to simultaneously form a multiplicity of rafters; applying pressure to the gussets to squeeze together the gussets and chords, and maintaining said pressure until the gussets and the respective chords are bonded by the adhesive.

2. A method for simultaneously manufacturing a multiplicity of trussed rafters having chords and gussets with an adhesive bond between the chords and the gussets, said trussed rafters having bottom chords and top chords, said top chords meeting at an apex, a peak gusset overlying said top chords and being bonded to the same to form an integral unit, heel gussets being bonded to the top chords and the bottom chords to form an integral trussed rafter, said method comprising: positioning the chords in the desired position, placing the gussets over the adjacent chords, insuring that there is an adhesive between the gussets and respective chords, repeating said process until there are a multiplicity of aligned chords and gussets with adhesive between the gussets and the respective chords, applying pressure to the gussets to squeeze together the gussets and chords, and maintaining said pressure until the gussets and the respective chords are bonded by the adhesive.

3. A method for simultaneously manufacturing a multiplicity of king post trussed rafters having chords and gussets with an adhesive bond between the chords and the gussets and packaging the rafters for delivery, said rafters having two bottom chords, two top chords and a king post, a splice gusset joining together the two bottom chords and the king post, two heel gussets joining together a bottom chord with a respective top chord, a peak gusset joining together the top chords and the king post, said method comprising: positioning the chords and gussets of a first rafter in the desired position, insuring that there is an adhesive between the gussets and chords and post; positioning the chords and gussets of a second rafter in the desired position with the chords of the second rafter aligned with the corresponding chords of the first rafter and with the gussets of the second rafter aligned with the corresponding gussets of the second rafter, insuring that there is an adhesive between the gussets and the respective chords; performing said positioning of the chords and the gussets as many times as desired to simultaneously form a multiplicity of rafters; applying pressure to the gussets to squeeze together the gussets and chords, maintaining said pressure until the gussets and the respective chords are bonded by the adhesive, and while maintaining pressure on the trussed rafters strapping together the same to form a packaged unit.

4. A method for simultaneously manufacturing a multiplicity of trussed rafters of various configurations, said trussed rafters having chords and gussets with an adhesive between the chords and the gussets, said trussed rafters being referred to as first rafters and second rafters; said first rafter having a bottom chord and two top chords, said top chords meeting at an apex to form an integral unit, heel gussets being bonded to the top chords and the bottom chords to form an integral trussed rafter; said second rafter having a bottom chord, a top chord and a king post, a peak gusset being bonded to the king post and the top chords, a splice gusset being bonded to the king post and the bottom chord, a heel gusset being bonded to the bottom chord and the top chord; said process comprising: positioning the chords of the first rafter in the desired position, placing the gussets over the adjacent chords, insuring that there is an adhesive between the gussets and respective chords; positioning the chords of the second rafter in the desired position, placing the gussets over the adjacent chords and aligned with the corresponding gussets of the first rafter, in the absence of gussets and chords of the second rafter with respect to the first gusset then the placing of spacers in alignment with the gussets of the first rafter, said spacer block being the thickness of the gussets and chords, applying pressure to the gussets and spacer blocks to squeeze together the gussets and chords, and maintaining said pressure until the gussets and the respective chords are bonded by the adhesive.

5. A method for simultaneously manufacturing a multiplicity of king-post trusses having a lower chord, an upper chord at an angle with respect to the lower chord, a king-post, a heel gusset, a splice gusset and a peak gusset, said method comprising: positioning the heel gussets, the splice gusset and the peak gusset at the proper places, positioning the upper chords, the lower chords and the king-post at the proper positions with respect to said gussets, insuring that there is an adhesive between the gussets and respective chords; performing said positioning of the chords and gussets as many times as desired to simultaneously form a multiplicity of rafters; applying pressure to the gussets to equeeze together the gussets and the chords and maintaining said pressure until the gussets and the respective chords are bonded by the adhesive.

6. A method for simultaneously manufacturing a multiplicity of different size king-post trusses having a lower chord, an upper chord at an angle with respect to the lower chord, a king-post, a heel gusset, a splice gusset and a peak gusset, said method comprising: positioning the two heel gussets, the splice gusset, and the peak gusset at the proper places, juxtapositioning the upper chord with respect to the peak and the heel gussets, positioning the lower chords at the proper positions with respect to the heel and the splice gussets, positioning the king-post with respect to the peak and the splice gussets, insuring that there is an adhesive between the gussets and the respective chords; performing said positioning of the chords and the gussets as many times as desired to simultaneously form a multiplicity of rafters; said chords in a truss may be of different lengths and said chords in one truss may be of a different length than the corresponding chords in another truss with the provision that the gussets in all of the trusses are in a bearing relationship with each other so as to substantially overlie each other; and, applying pressure to the gussets to squeeze together the gussets and the chords and maintaining said pressure until the gussets and the respective chords are bonded by the adhesive.

7. A method for simultaneously manufacturing a multiplicty of different size king-post trusses having a lower chord, an upper chord at an angle with respect to the lower chord, a king-post, a heel gusset, a splice gusset and a peak gusset, said method comprising: positioning the two heel gussets, the splice gusset, and the peak gusset at the proper places, juxtapositioning the upper chord with respect to the peak and the heel gussets, positioning the lower chords at the proper positions with respect to the heel and the splice gussets, positioning the king-post with respect to the peak and the splice gussets, insuring that there is an adhesive between the gussets and the respective chords; performing said positioning of the chords and the gussets as many times as desired to simultaneously form a multiplicity of rafters; said chords in a truss may be of different lengths and said chords in one truss may be of a different length than the corresponding chords in another truss with the provision that the gussets in all of the trusses are in a bearing relationship with each other so as to substantially overlie each other; and, in the absence of gussets and chords of a truss then the placing of spacers in alignment with the gussets of the other trusses, said spacer block being the thickness of the gussets and chords; and, applying pressure to the gussets to squeeze together the gussets and the chords and maintaining said pressure until the gussets and the respective chords are bonded by the adhesive.

8. A method for simultaneously manufacturing a multiplicity of trussed rafters having chords and gussets with an adhesive bond between the chords and the gussets, said method comprising: positioning the chords and gussets of a first rafter in the desired position, insuring that there is an adhesive between the gussets and respective chords; positioning the chords and gussets of a second rafter in the desired position with respect to the gussets of the first rafter, insuring that there is an adhesive between the gussets and the respective chords; performing said positioning of the chords and the gussets as many times as desired to simultaneously form a multiplicity of rafters; applying pressure to the gussets to squeeze together the gussets and chords, maintaining said pressure until the gussets and the respective chords are bonded by the adhesive, and strapping together the trussed rafters to form a packaged unit.

9. A method for manufacturing a king-post trussed rafter, said method comprising:
  (a) positioning chords and gussets of a first rafter in a preferred and substantially horizontal position;
  (b) insuring that there is an adhesive between the gussets and respective chords;
  (c) positioning chords and gussets of a second rafter in a preferred and substantially horizontal position with respect to the gussets of the first rafter;
  (d) insuring that there is an adhesive between the gussets and the respective chords of the second rafter;
  (e) performing said positioning of the chords and gussets as many times as desired with the chords and gussets being in a stacked relationship to simultaneously form a multiplicity of rafters;
  (f) applying pressure to the gussets to squeeze together the gussets and chords; and
  (g) maintaining said pressure until the gussets and the respective chords are bonded by the adhesive.

10. A method for manufacturing a king-post trussed rafter, said king-post trussed rafter having bottom chords and top chords, said top chords meeting at an apex, a peak gusset overlying said top chords and being bonded to the same to form an integral unit, heel gussets being bonded to the top chords and the bottom chords to form an integral trussed rafter, said method comprising:
  (a) positioning the chords in a desired and substantially horizontal position;
  (b) placing the gussets over the adjacent chords;
  (c) insuring that there is an adhesive between the gussets and the respective chords;
  (d) repeating said process until there are a multiplicity of aligned chords and gussets in a stacked relationship with adhesive between the gussets and the respective chords;
  (e) applying pressure to the gussets to squeeze together the gussets and chords; and,
  (f) maintaining said pressure until the gussets and the respective chords are bonded by the adhesive.

11. A method for manufacturing a king-post trussed rafter, said rafter having two bottom chords, two top chords and a king post, a splice gusset joining together the two bottom chords and the king post, two heel gussets joining together a bottom chord with a respective top chord, a peak gusset joining together the top chords and the king post, said method comprising:

(a) positioning the chords and gussets of a first rafter in a preferred and substantially horizontal position;

(b) insuring that there is an adhesive between the gussets and chords and king post;

(c) positioning the chords and gussets of a second rafter in a preferred and substantially horizontal position with the chords of the second rafter aligned with the corresponding chords of the first rafter and with the gussets of the second rafter aligned with the corresponding gussets of the first rafter;

(d) insuring that there is an adhesive between the gussets and the respective chords;

(e) performing said positioning of the chords and the gussets as many times as desired, with the chords and gussets being in a stacked relationship, to simultaneously form a multiplicity of rafters;

(f) applying pressure to the gussets to squeeze together the gussets and chords;

(g) maintaining said pressure until the gussets and respective chords are bonded by the adhesive; and, (h) while maintaining pressure on the trussed rafters strapping together the trussed rafters to form a packaged unit.

12. A method for manufacturing a king-post trussed rafter having a lower chord, an upper chord at an angle with respect to the lower chord, a king post, a heel gusset, a splice gusset and a peak gusset, said method comprising:

(a) positioning the heel gusset, the splice gusset and the peak gusset at the preferred and substantially horizontal positions;

(b) positioning the upper chord, the lower chord and the king post at the preferred and substantially horizontal positions;

(c) insuring that there is an adhesive between the gussets and respective chords;

(d) performing said positioning of the chords and gussets as many times as desired with the chords and gussets being in a stacked relationship to simultaneously form a multiplicity of rafters;

(e) applying pressure to the gussets to squeeze together the gussets and the chords; and, (f) maintaining said pressure until the gussets and the respective chords are bonded by the adhesive.

13. A method for manufacturing a multiplicity of different size king-post trussed rafters having a lower chord, an upper chord, at an angle with respect to the lower chord, a king post, a heel gusset, a splice gusset and a peak gusset, said method comprising:

(a) positioning the two heel gussets, the splice gusset, and the peak gusset at the preferred and substantially horizontal positions;

(b) juxtapositioning the upper chord with respect to the peak and heel gussets;

(c) positioning the lower chords at the proper positions with respect to the heel and the splice gussets;

(d) positioning the king post with respect to the peak and the splice gussets;

(e) insuring that there is an adhesive between the gussets and the respective chords;

(f) performing said positioning of the chords and the gussets as many times as desired with the chords and the gussets being in a stacked relationship to simultaneously form a multiplicity of rafters;

(g) said chords in a truss may be of different lengths and said chords in one truss may be of a different length than the corresponding chords in another truss with the provision that the gussets in all of the truss rafters are in a bearing relationship with each other so as to substantially overlie each other;

(h) applying pressure to the gussets to squeeze together the gussets and the chords; and, (i) maintaining said pressure until the gussets and the respective chords are bonded by the adhesive.

14. A method for manufacturing a multiplicity of different size king-post trussed rafters having a lower chord, an upper chord at an angle with respect to the lower chord, a king post, a heel gusset, a splice gusset, and a peak gusset, said method comprising:

(a) positioning the two heel gussets, the splice gusset, and the peak gusset at the preferred and substantially horizontal position;

(b) juxtapositioning the upper chord with respect to the peak and the heel gussets;

(c) positioning the lower chords at the preferred positions with respect to the heel and the splice gussets;

(d) positioning the king post with respect to the peak and the splice gussets;

(e) insuring that there is an adhesive between the gussets and the respective chords;

(f) performing said positioning of the chords and the gusset as many times as desired with the chords and gussets being in a stacked relatioinship to simultaneously form a multiplicity of rafters;

(g) said chords in a truss may be of different lengths and said chords in one truss may be of a different length from the corresponding chords in another truss with the provision that the gussets in all of the rafters are in a bearing relationship with each other so as to substantially overlie each other and, in the absence of gussets and chords of a truss, then the placing of spacer blocks in alignment with the gussets of the other trusses, said spacer blocks being the thickness of the gussets and chords;

(h) applying pressure to the gussets to squeeze together the gussets and the chords; and, (i) maintaining said pressure until the gussets and the respective chords are bonded by the adhesive.

References Cited by the Examiner

UNITED STATES PATENTS

| | | | |
|---|---|---|---|
| 1,870,693 | 8/1932 | Sherts | 156—288 X |
| 1,897,548 | 2/1933 | Butterworth | 156—304 X |
| 2,069,073 | 1/1937 | Linquist | 144—313 |
| 2,183,599 | 12/1939 | Welch | 156—288 |
| 2,509,494 | 5/1950 | Gruenwald | 156—92 |
| 2,531,375 | 11/1950 | Delegard et al. | 156—92 |
| 2,655,459 | 10/1953 | Gordon et al. | 156—92 |
| 2,919,733 | 1/1960 | Johnson | 144—288 |
| 2,973,022 | 2/1961 | Danielson et al. | 144—288 |
| 2,996,721 | 8/1961 | Black | 227—252 |
| 3,036,947 | 5/1962 | Marra | 156—321 |
| 3,068,483 | 12/1962 | Moelenpah et al. | 144—288 |
| 3,243,177 | 3/1966 | Christman et al. | 144—288 X |

OTHER REFERENCES

Boyd: "Agriculture Engineering," vol. 36, November 1955, pp. 739–742.

EARL M. BERGERT, *Primary Examiner.*

HAROLD ANSHER, *Examiner.*